(12) United States Patent (10) Patent No.: US 7,752,143 B2
Frederick (45) Date of Patent: Jul. 6, 2010

(54) METHOD AND SYSTEM FOR ADD-IN MODULE FOR OBTAINING SHIPPING INFORMATION

(75) Inventor: Kenneth A Frederick, Pleasanton, CA (US)

(73) Assignee: United Parcel Service of America, Inc., Atlanta, GA (US)

( * ) Notice: Subject to any disclaimer, the term of this patent is extended or adjusted under 35 U.S.C. 154(b) by 473 days.

(21) Appl. No.: 11/771,645

(22) Filed: Jun. 29, 2007

(65) Prior Publication Data

US 2008/0015882 A1 Jan. 17, 2008

Related U.S. Application Data

(63) Continuation of application No. 10/142,749, filed on May 8, 2002, now Pat. No. 7,349,854.

(60) Provisional application No. 60/289,688, filed on May 8, 2001.

(51) Int. Cl.
*G06Q 99/00* (2006.01)
(52) U.S. Cl. ...................................... 705/333
(58) Field of Classification Search .................. 705/1, 705/26, 27, 333
See application file for complete search history.

(56) References Cited

U.S. PATENT DOCUMENTS

| | | | |
|---|---|---|---|
| 5,761,689 | A | 6/1998 | Rayson et al. |
| 5,875,443 | A | 2/1999 | Nielsen |
| 5,896,321 | A | 4/1999 | Miller et al. |
| 5,970,492 | A | 10/1999 | Nielsen |
| 6,047,264 | A | 4/2000 | Fisher et al. |
| 6,220,509 | B1 | 4/2001 | Byford |
| 6,463,420 | B1 | 10/2002 | Guidice et al. |
| 6,948,134 | B2 | 9/2005 | Gauthier et al. |

(Continued)

FOREIGN PATENT DOCUMENTS

EP 0788062 A2 6/1997

(Continued)

OTHER PUBLICATIONS

Letter from Japanese associate reporting that a Final Decision of Rejection has been issued, dated Nov. 20, 2007.

(Continued)

*Primary Examiner*—Amee A Shah
(74) *Attorney, Agent, or Firm*—Alston & Bird LLP (57) ABSTRACT

The present invention enables users to access shipping information pertaining to the shipment of parcels by utilizing an add-in module that is distributed from a remote server to the users. Specifically, the add-in module is invoked by merely selecting an action from a tool bar or menu associated with a text string in a document or spreadsheet either recognized by a MICROSOFT OFFICE® smart tag or highlighted by the user. The actions from which to select include but are not limited to tracking, time in transit, or shipping history. The add-in module is adapted to recognize the text string located in the document or spreadsheet and to transmit the text string to a database server connected to the network and adapted for receiving the text string, querying a database to retrieve shipping information corresponding to the text string, and transmitting the shipping information to the user via the communications network.

14 Claims, 7 Drawing Sheets

U.S. PATENT DOCUMENTS

| | | | |
|---|---|---|---|
| 2001/0002900 A1* | 6/2001 | Romrell .................... | 370/216 |
| 2002/0032612 A1 | 3/2002 | Williams et al. | |
| 2002/0032754 A1* | 3/2002 | Logston et al. ............ | 709/219 |
| 2002/0083093 A1 | 6/2002 | Goodisman et al. | |
| 2002/0143828 A1* | 10/2002 | Montero et al. ............ | 707/533 |

FOREIGN PATENT DOCUMENTS

| | | |
|---|---|---|
| JP | 9319749 A | 12/1997 |
| JP | 2000242721 | 9/2000 |
| JP | 2000268101 | 9/2000 |
| JP | 2001109684 | 4/2001 |
| JP | 2001117997 | 4/2001 |
| WO | WO9708628 | 3/1997 |

OTHER PUBLICATIONS

References cited from European Supplemental Search Report dated Sep. 10, 2007.

"TanData Uses XML Technology to Enhance Shipping Software Solution," PR Newswire, New York, Apr. 6, 2001, p. 1.

Gilbert, Alorie, Rule No. 1, Don't Annoy Your Customers—Online Retailers Arts Learning to Use Improved Logistics To Keep Customers Happy, Information Week, Dec. 13, 1999, p. 134.

Janah, et al., Special Delivery, Information Week, Oct. 27, 1997, No. 654, p. 42; 6 pages.

International Search Report mailed Apr. 29, 2003.

Japanese Office Action for Japanese Patent Application No. 2002-588324 mailed Dec. 5, 2006.

Japanese Non-Patent Literature cited in Japanese Office Action for Japanese Patent Application No. 2002-588324, pp. 173-177.

* cited by examiner

| | A | B | C | D | E | F | G |
|---|---|---|---|---|---|---|---|
| 1 | ABC COMPANY | | | | | | |
| 2 | | | | | | | |
| 3 | 123 Anywhere street | | | | Phone: 123.456.7890 | | |
| 4 | SUITE #100 | | | | Fax: 123.456.7890 | | |
| 5 | Anywhere, CA 12345 | | | | E-Mail: someone@anywhere.com | | |
| 6 | USA | | | | | | |
| 7 | | | | | | | |
| 8 | Statement | | | | | | |
| 9 | | | | | | | |
| 10 | | Statement #: | 123456 | | Bill To: | | |
| 11 | | Date: | 2/1/01 | | Satisfied Customer | | |
| 12 | | Customer ID: | 1234 | 42 | 987 Main Street | | |
| 13 | | UPS Tracking #: | 1z950x9703 ▽ 6543 | | Suite #1 | | |
| 14 | | | Smart Tag Actions | | Businessville, CA 98765 | | |
| 15 | | | | | USA | | |
| 16 | | | | | | | |
| 17 | Date | Type | Invoice # | Description | Amount | Payment | Balance |
| 18 | 2/1/01 | Replen | 12345678 | Pens | $ 20.00 | $ - | $ 20.00 |
| 19 | | | | | | | |
| 20 | | | | | | | |

METHOD AND SYSTEM FOR ADD-IN MODULE FOR OBTAINING SHIPPING INFORMATION

CROSS-REFERENCE TO RELATED APPLICATIONS

The present application is a Continuation of U.S. application Ser. No. 10/142,749, filed May 8, 2002 now U.S. Pat. No. 7,349,854, and titled "Method, Apparatus and Medium for Obtaining Shipping Information", which claims priority to U.S. Provisional Application No. 60/289,688, filed May 8, 2001, and titled "Carrier and Package Delivery Smart Tags," the disclosure of which is incorporated herein by reference.

BACKGROUND OF THE INVENTION

I. Field of the Invention

The present invention relates to desktop tools for the provisioning and management of package delivery.

II. Description of Related Art

The management of parcel shipping data within a company, regardless of the size of the company, is an important function. By efficiently managing and using parcel shipping data, the company can save significant transaction and overhead costs. To that end, carriers have developed and deployed numerous software tools that enable their customers to access shipping data more efficiently than ever before. For example, United Parcel Service of America, Inc. ("UPS") has launched a web-based service called MY UPS.COM™ to provide customers with internet shipping services, enhanced tracking services, supply order services, etc., through an automated system that provides requested information in real time.

While such tools are an improvement over prior art systems and methods, these tools still require the user to perform numerous steps to obtain certain shipping information. For example, a user working on a spreadsheet document or word processor document may identify within that document a tracking number associated with a certain parcel for which the user wishes to obtain shipping information such as the status of the parcel's delivery. In order to obtain this information, the user typically has to open their internet browser application, go to a particular web site provided by the carrier, possibly log into the web site and then either type or copy/paste the tracking number into the appropriate web page. The web site then processes the tracking number and then presents the requested shipping information to the user via a web page interface. If the user then wishes to place some or all of the shipping information into the spreadsheet or word processor document, then the user must copy that information from the internet browser application and paste it into the document in which they are working, often creating formatting problems in the document.

Accordingly, there is a yet unsatisfied need in the industry for further reducing the steps required by a user to obtain and process shipping data.

BRIEF SUMMARY OF THE INVENTION

The present invention enables users to access shipping information pertaining to the shipment of parcels by utilizing an add-in module that is distributed from a remote server to the users. Specifically, the add-in module is invoked by merely selecting an action from a tool bar or menu associated with a text string in a document or spreadsheet either recognized by a MICROSOFT OFFICE® smart tag or highlighted by the user. The actions from which to select include but are not limited to tracking, time in transit, or shipping history, label generation, address validation, proof of delivery and rate, and service selection. The add-in module is adapted to recognize the text string located in the document or spreadsheet and to transmit the text string to a database server connected to the network and adapted for receiving the text string, querying a database to retrieve shipping information corresponding to the text string, and transmitting the shipping information to the user via the communications network.

In accordance with embodiments of the present invention, a system for obtaining shipping information associated with a parcel comprises a distribution server adapted for distributing add-in modules via a communications network, and a plurality of customer devices connected to the network to receive the add-in modules. In various embodiments, the add-in module comprises computer readable medium in the form of a plug-in, a COM object, an Active X Control, or a DLL.

Each customer device executes a respective one of the add-in modules, wherein the add-in module is adapted for recognizing predefined or user-selected text strings located in a file or document for which one or more predefined actions can be invoked to transmit the text string via the network to a database server. In various embodiments, the predefined action may include a smart tag function, enhanced toolbar/menu command, or enhanced toolbar/menu icon.

The database server is adapted for receiving the text string, querying a database to retrieve shipping information corresponding to the text string, and transmitting the shipping information corresponding to the text string to the customer device via the network. In various embodiments, the shipping information may include one or more of tracking information, transit information, address validation information, shipping label generation data, or rate information.

In accordance with other embodiments of the invention, a method for providing an add-in module configured to obtain shipping information comprises adapting a distribution server for distributing add-in modules via the communications network, wherein the add-in module is adapted for recognizing predefined or user-selected text strings located in a file or document for which one or more predefined actions can be invoked to transmit the text string via the network to a database server adapted for receiving the text string, querying a database to retrieve shipping information corresponding to the text string, and transmitting the shipping information corresponding to the text string to the customer device via the communications network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code embodied in the storage medium. More particularly, the present invention may take the form of web-implemented computer software. Any suitable computer-readable storage medium that participates in providing instructions to a computer or processor for execution may be suitable. Such a medium may take many forms, including but not limited to, non-volatile media, volatile media, and transmission media. Non-volatile media include, for example, optical or magnetic disks. Volatile media include dynamic memory, such as a computer's main memory. Transmission media include coaxial cables, copper wire and fiber optics. Transmission media can also take the form of acoustic or light waves, such as those generated during radio frequency (RF) and infrared (IR) data communications. Examples of common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention enables customers of parcel carriers to access shipping information pertaining to the shipment of parcels without having to perform numerous steps such as launching new applications on their desktop, inputting data, copying/pasting data, etc. The present invention enables a user to automatically access shipping information located on a remote server. The user merely selects an action associated with a text string either recognized by a MICROSOFT OFFICE® smart tag or highlighted by user. The actions from which to select include tracking, time in transit, shipping history, label generation, address validation, proof of delivery and rate and service selection. The present invention automatically cuts the necessary text, opens or accesses databases, files, applications, websites, etc., to obtain the desired shipping information and then processes the data retrieved (including cutting, pasting, inserting or manipulating data and initiating actions such as dialing a phone number, generating a label or sending an e-mail). Of particular note, the present invention can do this without leaving the application in which a user is working, such as MICROSOFT EXCEL®, WORD®, or OUTLOOK®.

The present invention can utilize MICROSOFT OFFICE® smart tags to automatically recognize words, phrases, numbers and patterns in a MICROSOFT EXCEL®, Word or Outlook document. For example, a tracking number, postal code or a proper name having a particular pattern can be recognized. Smart tags work in a similar manner to that of the spell check feature in MICROSOFT WORD® by adding intelligence to applications to flag mistakes or automatically change them. With smart tags, however, an identified text string is flagged with some sort of visual indication (e.g., a notice information icon) because it is of interest or needs some kind of attention. The smart tag application utilizes recognizer to identify certain text strings having particular patterns, such as a tracking number, proper name, and postal code.

The user can then left-click on the visual indicator with their mouse to reveal one or more optional action to be conducted based on the recognized text string. In an alternative embodiment, the user highlights the text string of interest and then select a toolbar command or menu item custom designed for the present invention that provides for substantially the same action as the smart tags. This embodiment is particularly useful when the text string of interest is unique to that customer and the generally deployed add-in for smart tags would not include a recognizer for that text string.

Once the action has been selected, the present invention executes the action by copying the recognized or highlighted text string (and possibly other related data associated with the user or customer) and preparing the appropriate request for data in accordance with the selected action. This may include launching other applications such as a web browser or accessing databases or files located within a local network (e.g., LAN) or an external network (e.g., the internet). The retrieved shipping information is then processed for presentation to the user, such as by pasting the information in the document in which the text string was identified or by presenting the information in a message box.

Figure 1:
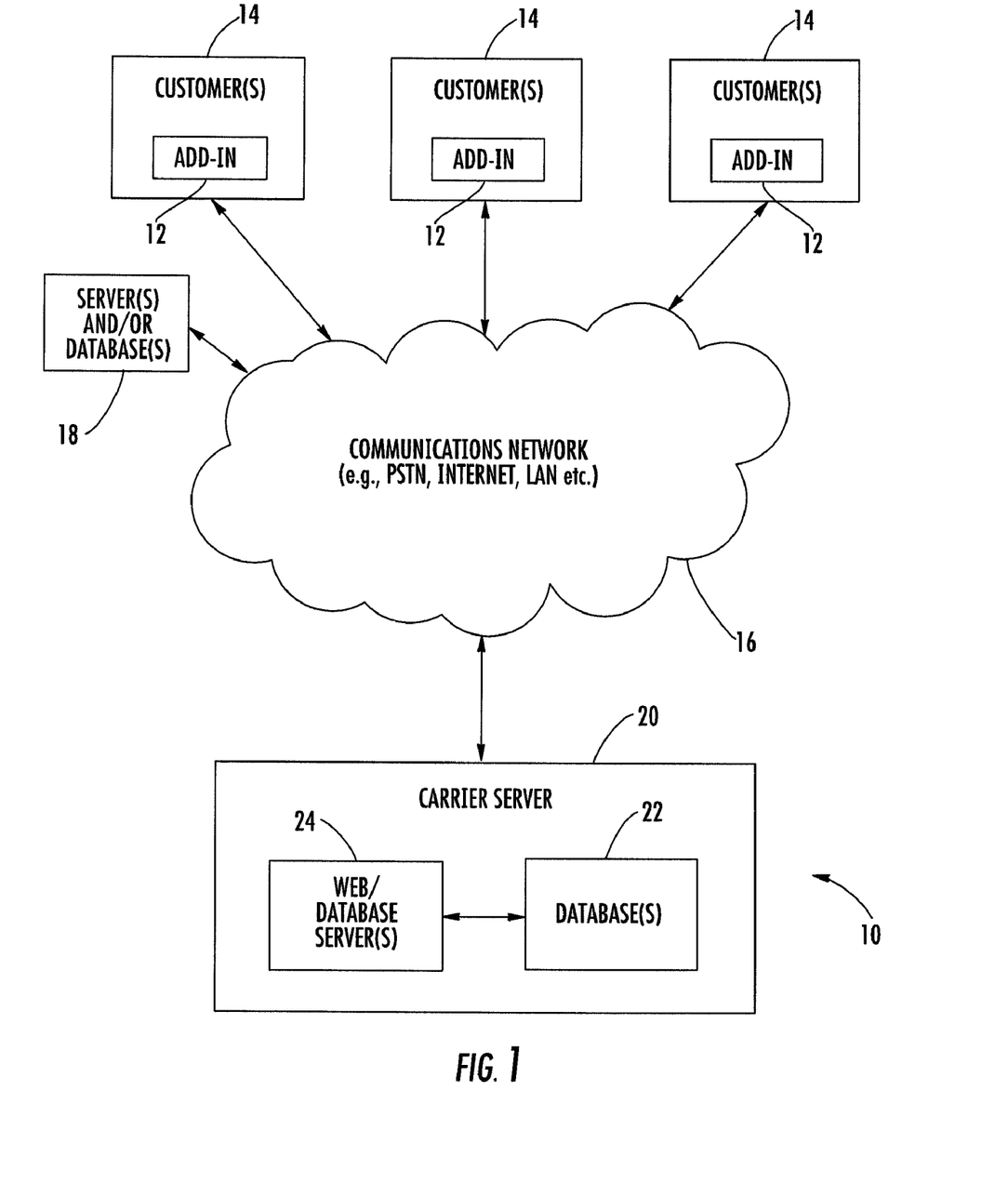
FIG. 1 is a block diagram illustrating the basic components of a computer system implementing an embodiment of the present invention.

With reference to FIG. 1, a system 10 implementing an embodiment of the present invention is illustrated. The illustrated embodiment of the present invention delivers its functionality to customers via an add-in software module (hereinafter "add-in") 12. The add-ins 12 are installed on a customer devices 14. The customer device 14 may comprise a desktop computer, PDA, telephone, or any other messaging or communication device with sufficient resources to support communications with other devices via a communications network 16. The communications network 16 in the preferred embodiment comprises the internet, though it will be appreciated by those skilled in the art that the communications network 16 may comprise a public switch telephone network (PSTN), local area network (LAN), cellular or satellite network, cable network, or any other suitable communications network, alone or in combination with one another and the Internet. Accordingly, the customer devices 14 are able to communicate with a customer server/database 18 and/or a carrier server 20 via the communications network 16.

The add-in 12 comprises software code which can be installed in connection with a client-based application operating on customer device 14, such as a plug-in, COM object, Active X Control, or DLL installed in connection with MICROSOFT OFFICE®. The add-in 12 may be provided and installed from a computer readable medium such as a diskette, CD, flash card (or the equivalent), or downloaded via the communications network 16 from a remote location, such as the carrier server 20. Depending on the functionality desired, the add-in 12 can be invoked as a smart tag function or as an enhanced toolbar/menu command or icon. Stated differently, the add-in 12 can utilize the functionality of smart tags as the interface for recognizing text strings automatically and/or may add one or more customized icons (i.e., commands) to the toolbar or items to the menu bar of the application(s) to which it is installed. In either case, the execution of the selected actions on the identified text is substantially the same regardless of whether the action is selected from a smart tag option list or by selecting a customized toolbar icon or menu item.

The customer server(s) and/or database(s) 18 may be associated with one or more customers 14 as part of a single company's network. In this regard, certain shipping information may be stored remote to the customer device 14 but within the company's network. For example, a company may have numerous customer devices 14 distributed throughout a geographic area, all with substantially equal access to shipping information for the company stored on a single or multiple servers and/or databases 18. An example of such configuration is the UPS WorldShip® software solution.

Alternatively, a customer device 14 may access a remote carrier server 20 to obtain shipping information stored on one or more databases 22, which are accessible via one or more web/database servers 24. In this context, the add-in 12 generates and sends a request to the carrier server 20 via communications network 16, such as by establishing an internet connection and sending an XML message. The request it is received and processed by the web/database server 24, which may include the retrieval of certain shipping information stored in the database(s) 22. The web/database server 24 then prepares and sends a response back to the add-in 12 at the customer device 14, such as in the form of a web page or XML message. An example of such a carrier server is the UPS Online Tools, which is based on XML messaging.

Figure 2:
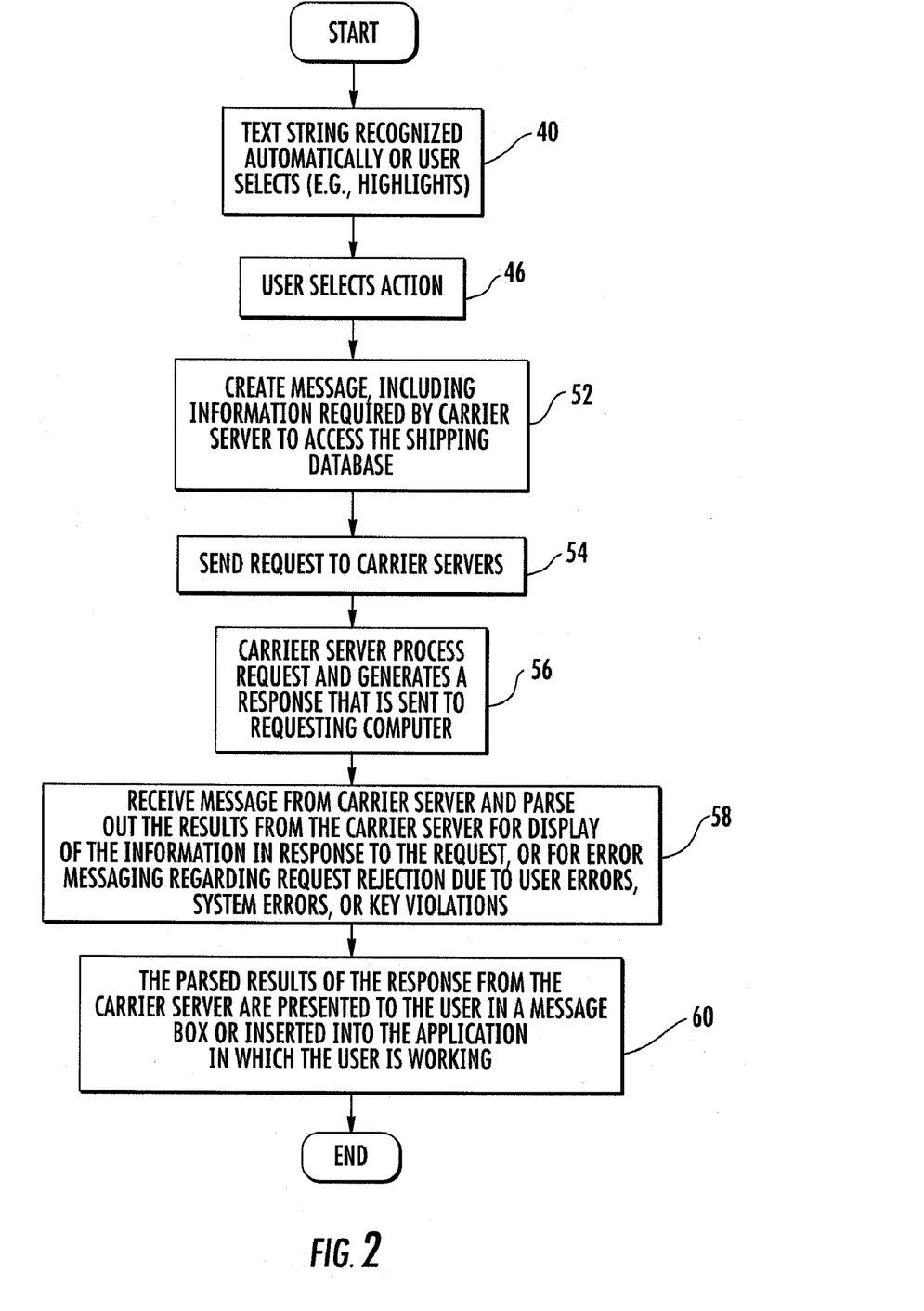
FIG. 2 is a flow chart illustrating a method in accordance with an embodiment of the present invention.
Figure 3:
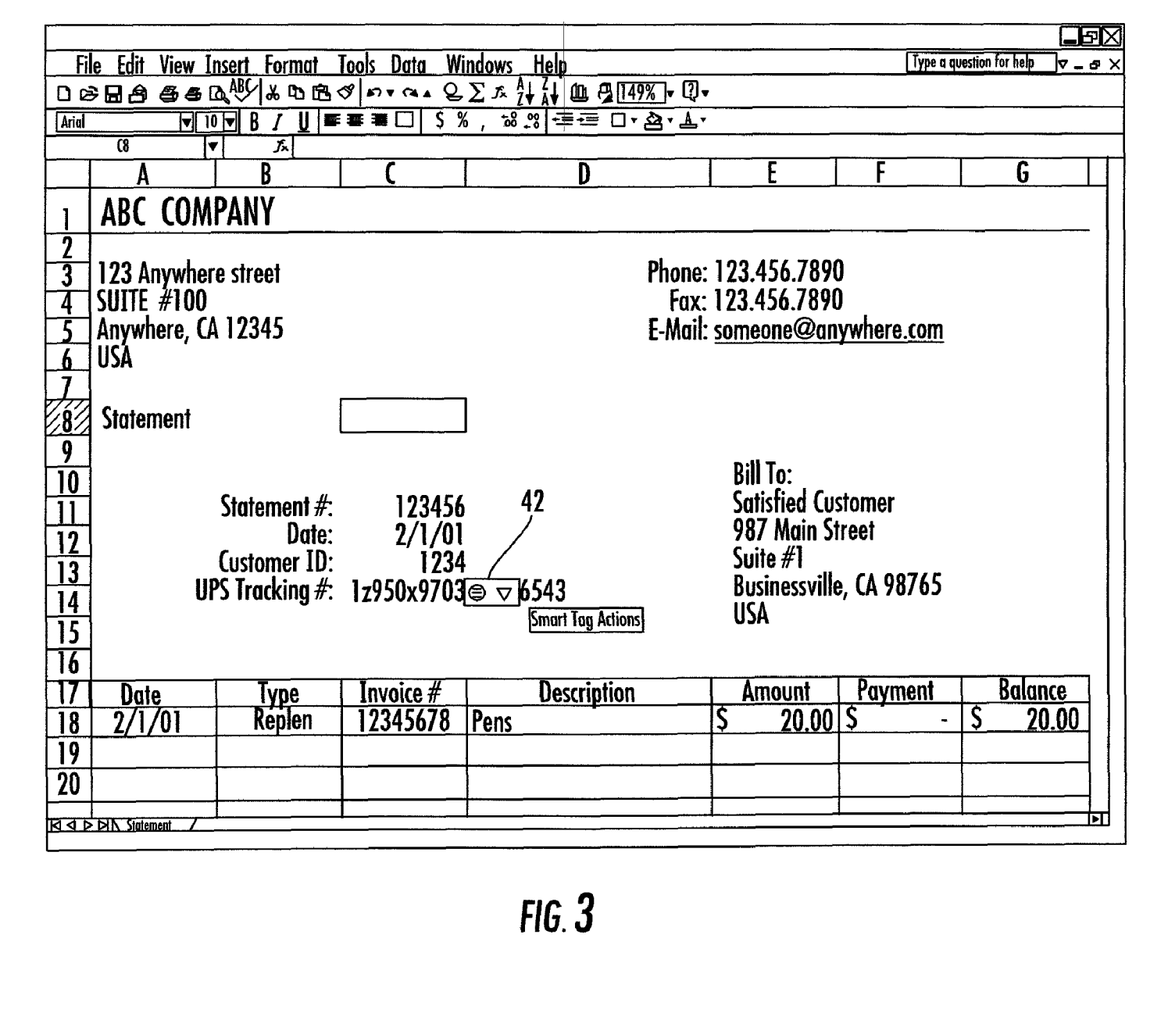
FIGS. 3-7 are illustrative user interfaces showing examples of an implementation in accordance of the present invention.

With reference to FIG. 2, a flowchart of the operation of a system for obtaining shipping information in accordance with an embodiment in the present invention is provided. It is assumed for purposes of the following discussion that an add-in 12 in accordance with the present invention has been installed on a customer device 14 so as to operate in accordance with the following methodology. In the embodiment described, an add-in 12 is installed into version of MICROSOFT OFFICE® XP for use with Office applications such as MICROSOFT WORD®, MICROSOFT EXCEL® and MICROSOFT OUTLOOK®. It is well known in the industry that the installation can be performed by an executable file that installs the add-in, making the appropriate entries in the program registry and the necessary program code is loaded onto the customer device. Once installed, at block 40, a text string is either recognized automatically by the smart tag feature of MICROSOFT OFFICE® or the user selects a text string such as by highlighting the text string with the cursor. In the case of the former, the add-in 12 includes recognizers defined to identify text strings of interest, such as a tracking number, which have a certain pattern such as "1ZX ...X." The recognized text string is identified by a distinctive visual marking, such as a notice information icon 42 as shown in FIG. 3. Alternatively, in the case of the latter, the text string is selected by the user, such as by highlighting the text string. This may be particularly advantageous with reference number tracking where a unique number (such as an account number) is given a parcel or group of parcels by the customer and the carrier tracks that number. Since the reference number may be different for each customer, it would be impractical if not impossible to build a smart tag recognizer suitable for all users. Therefore, in such circumstance, it is desirable to allow the user to select the text string, such as the text string 44 shown in FIG. 4.

Figure 4:
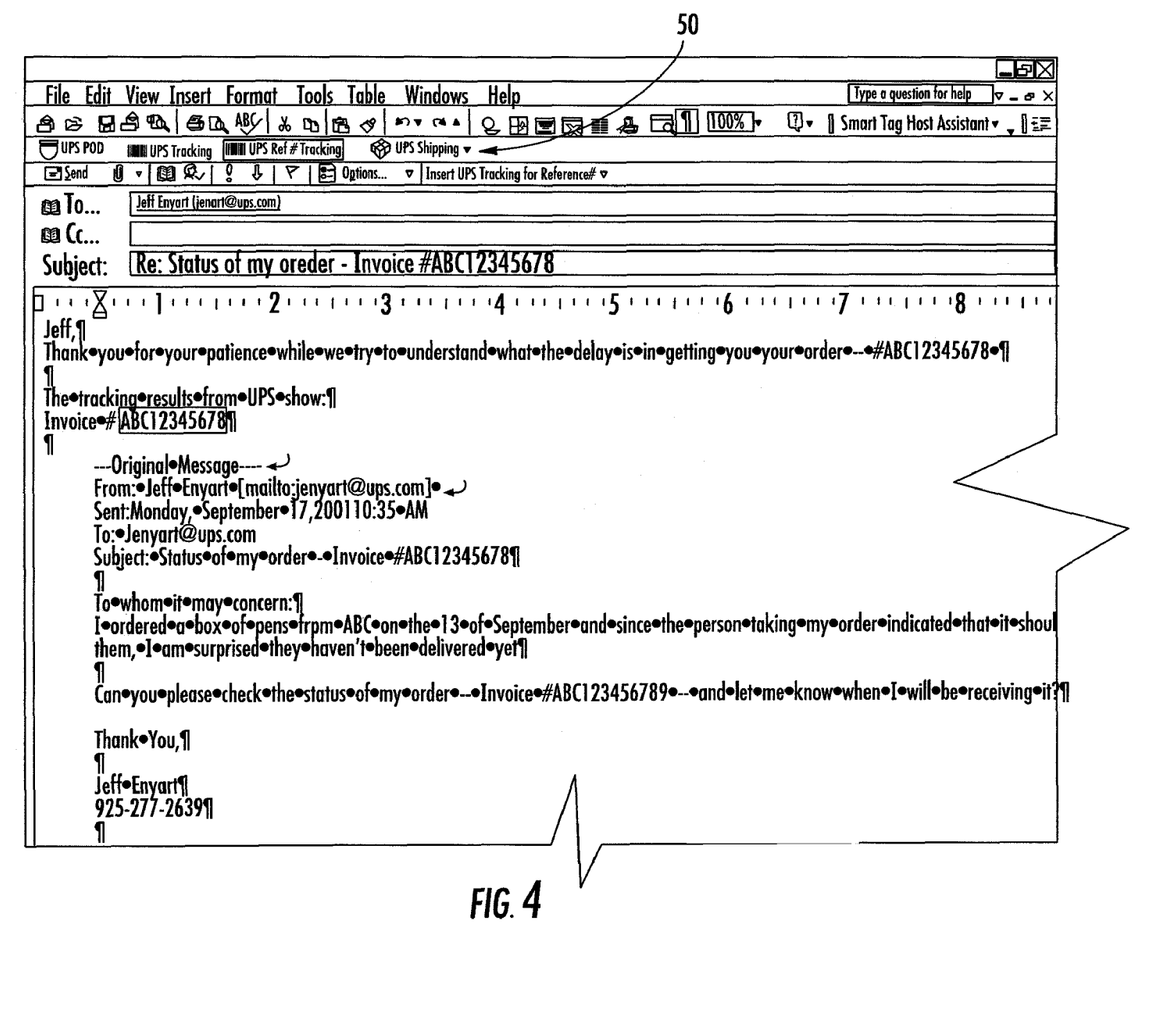
Figure 5:
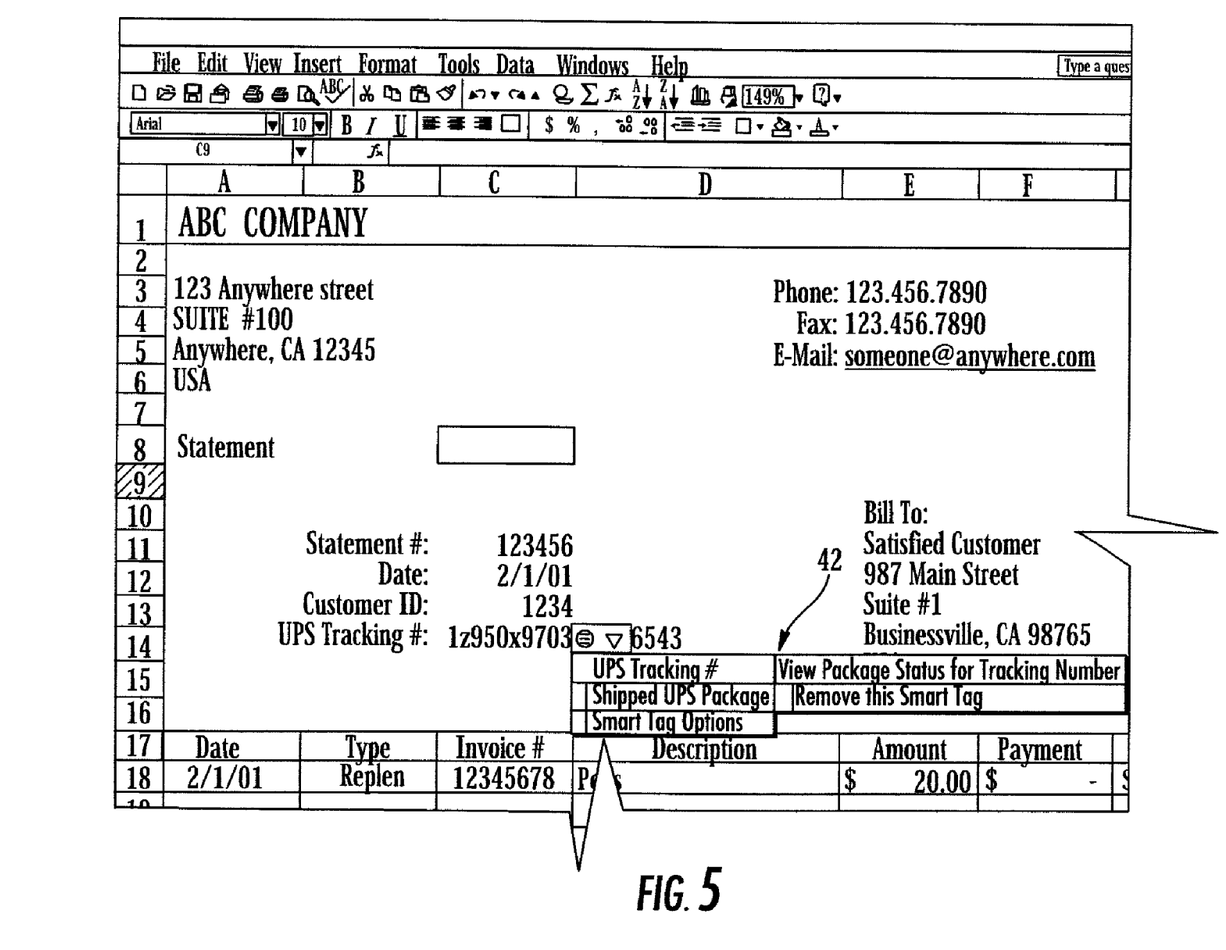

At block 46, the user is presented with selectable actions via the smart tag notice information icon drop down menu, such as the menu 48 shown in FIG. 5, or customized toolbar icons or menu bar items such as toolbar icons 50 shown in FIG. 4. The tool bar icons and/or menu bar items are generated by the add-in 12 upon installation, and may be selected by the user for invoking a certain action on the selected (e.g., highlighted) text. The user then selects a desired action from those available. In the case of the smart tag implementation, the actions presented to the user are preferably based upon the text string recognized. For example, if the text string recognized is a shipping number, the selectable actions presented to the user are limited to those appropriate for a shipping number. Examples of some of the selectable actions include tracking, time and transmit, shipping history, label generation, proof of delivery, address validation, signature tracking, and rate and service selection.

Once the user selects an action, the add-in executes the action. For purposes of the present discussion, the user requests an action that requires the add-in to access information that is remotely located, such as the MyUPS.com server and database. However, in accordance with the present invention, the action selected by the user may require access to data maintained within a company's network, such as data stored at a UPS WorldShip database. The present invention can also be extended to include access to contact list or other data maintained local to the customer device. Thus, at block 52, the add-in creates an appropriate request for executing the desired action. In the case of the embodiment discussed herein, this includes the creation of a message that includes information required by the carrier server to access the shipping information located at carrier server 22. For example, the request may include security and identity information necessary to access the data as well as the identified text string or a portion thereof.

At block 54, the request is sent to the carrier servers utilizing appropriate security and data compression protocols. At the carrier server 20 the request is processed and a response is generated and sent to the customer device. See block 56. The carrier server 20 functions such as authentication, reporting, tracking, and message rejection are performed as appropriate. At block 58, the message from the carrier server is received by the customer device and the results are parsed out for display of the shipping information to the user. This also includes, where appropriate, error messaging due cause by the user, system or otherwise.

Figure 6:
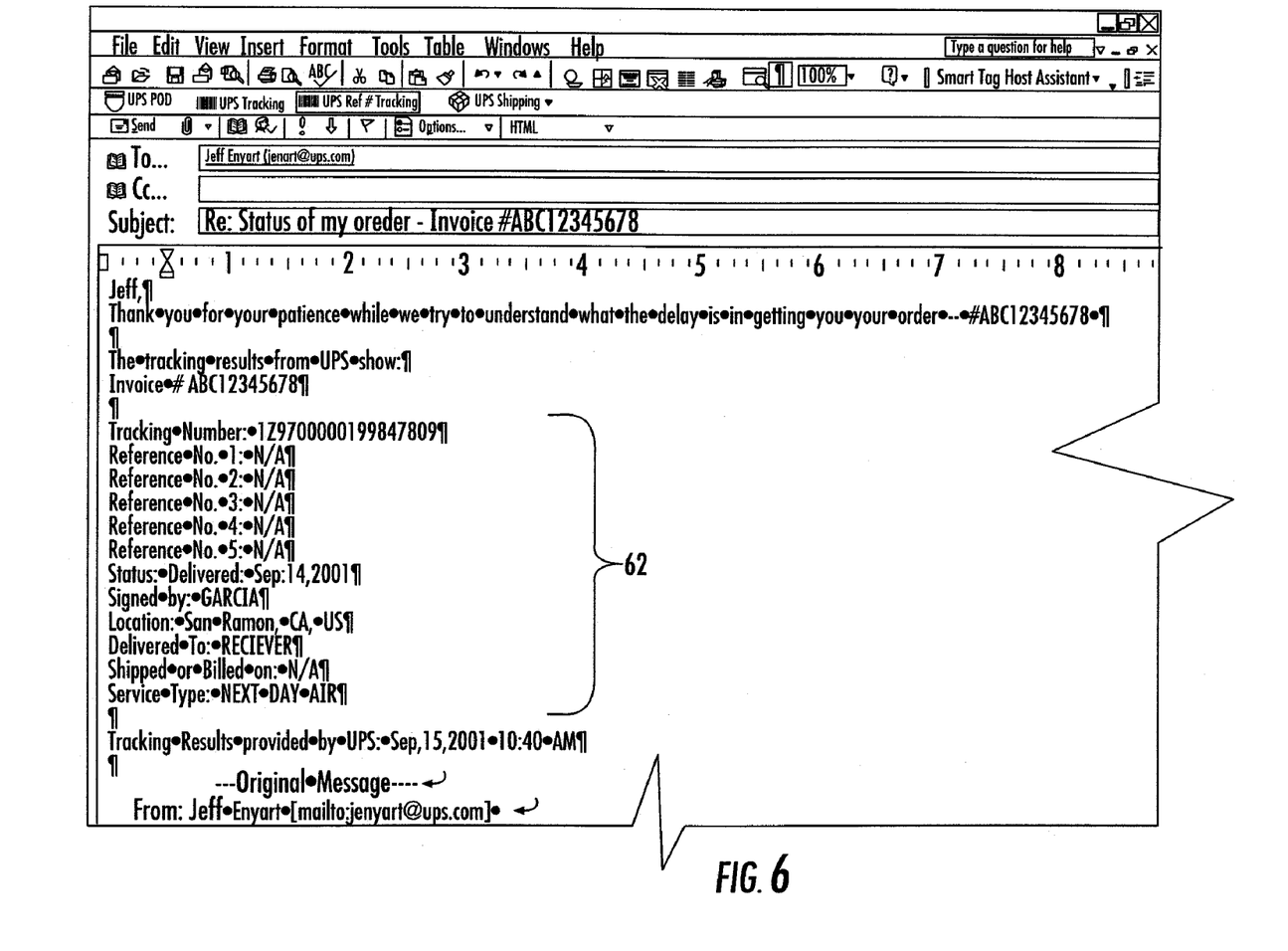
Figure 7:
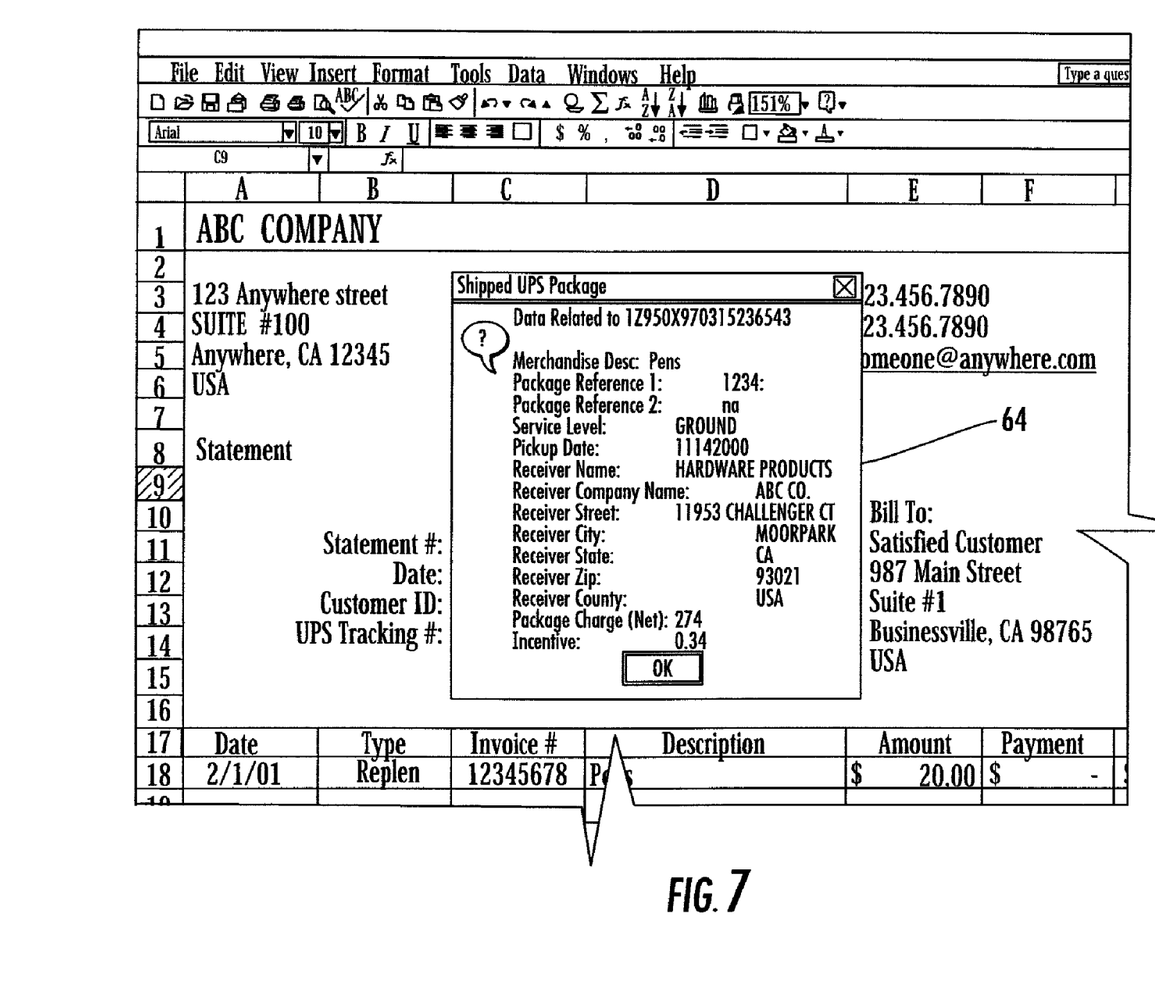

Lastly, at block 60, the parsed results from the carrier server 20 are presented to the user in one or more of a variety of ways. For example, the results may be inserted into the document or spreadsheet in which the text string was identified, as illustrated by insert 62 shown in FIG. 6. Alternatively, the results may be presented as a message box, as illustrated by message box 64 of FIG. 7. In addition, the results may be stored locally on the customer device or the customer server/database 18, as desired.

If the user is working in a MICROSOFT WORD® document, the results may be pasted at the end of the document or immediately after the text block in which the text string was identified. If the text string was identified in a table, then the results may be pasted in the same table cell as the identified text string. If the user is working in an MICROSOFT EXCEL® spreadsheet, then the results may be fanned in a single row from left to right or fanned down from top to bottom, in respective cells in either case. In addition, formatting may be added, such as column or row headings. If the user is working in MICROSOFT OUTLOOK®, then the results may be pasted at the end of the document or immediately after the text block in which the text string was identified.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for obtaining shipping information associated with a parcel, comprising:
 a distribution server adapted for distributing add-in modules via a communications network to a plurality of customer devices connected to the network, each customer device adapted to receive and execute a respective one of the add-in modules, the add-in module is adapted for recognizing predefined or user-selected text strings located in a file or document for which one or more predefined actions can be invoked to transmit one of the predefined or user-selected text strings via the network by analyzing a plurality of text strings in the file or document, wherein at least some of the text strings in the file or document are unrelated to shipping information for a parcel; and
 a database server connected to the network and adapted for receiving the text string, querying a database to retrieve shipping information corresponding to the text string, and transmitting the shipping information corresponding to the text string to one of the customer devices via the network.

2. The system of claim 1, wherein the add-in module is further adapted for:
 parsing the shipping information received from the database; and
 pasting the parsed shipping information into a file or document opened on a desktop of the customer device or displayed in a message window on the desktop of the customer device.

3. The system of claim 1, wherein the add-in module comprises computer readable medium selected from the group consisting of a plug-in, a COM object, an Active X Control, and a DLL.

4. The system of claim 1, wherein the predefined action is a smart tag function.

5. The system of claim 1, wherein the predefined action is an enhanced toolbar/menu command.

6. The system of claim 1, wherein the predefined action is an enhanced toolbar/menu icon.

7. The system of claim 1, wherein the shipping information includes one or more of tracking information, transit information, address validation information, shipping label generation data, or rate information.

8. A method for providing an add-in module configured to obtain shipping information, comprising:
 adapting a distribution server for distributing add-in modules via a communications network to a plurality of customer devices, wherein:
 upon one of the plurality of customer devices executing the add-in module, the add-in module is adapted for recognizing predefined or user-selected text strings located in a file or document for which one or more predefined actions can be invoked to transmit a one of the predefined or user-selected text strings by analyzing a plurality of text strings in the file or document, wherein at least some of the text strings in the file or document are unrelated to shipping information for a parcel, wherein the text string is transmitted via the network to a database server that is adapted for receiving the text string, querying a database to retrieve shipping information corresponding to the text string, and transmitting the shipping information corresponding to the text string to the customer device via the network.

9. The method of claim 8, wherein the add-in module is further adapted for:
 parsing the shipping information received from the database; and
 pasting the parsed shipping information into a file or document opened on a desktop of the customer device or displayed in a message window on the desktop of the customer device.

10. The method of claim 8, wherein the add-in module comprises computer readable medium selected from the group consisting of a plug-in, a COM object, an Active X Control, and a DLL.

11. The method of claim 8, wherein the predefined action is a smart tag function.

12. The method of claim 8, wherein the predefined action is an enhanced toolbar/menu command.

13. The method of claim 8, wherein the predefined action is an enhanced toolbar/menu icon.

14. The method of claim 8, wherein the shipping information includes one or more of tracking information, transit information, address validation information, shipping label generation data, or rate information.

* * * * *